(12) United States Patent
Zhou et al.

(10) Patent No.: US 11,981,515 B2
(45) Date of Patent: May 14, 2024

(54) IMAGE ACQUISITION SYSTEM AND ARTICLE INSPECTION SYSTEM

(71) Applicants: Tyco Electronics (Shanghai) Co. Ltd, Shanghai (CN); TE Connectivity Services GmbH, Schaffhausen (CH)

(72) Inventors: Lei (Alex) Zhou, Shanghai (CN); Dandan (Emily) Zhang, Shanghai (CN); Roberto Francisco-Yi Lu, Bellevue, WA (US); Rong Zhang, Shanghai (CN); Qing (Carrie) Zhou, Shanghai (CN)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 120 days.

(21) Appl. No.: 17/692,757

(22) Filed: Mar. 11, 2022

(65) Prior Publication Data
US 2022/0289495 A1   Sep. 15, 2022

(30) Foreign Application Priority Data
Mar. 11, 2021   (CN) .......................... 202110263815.9

(51) Int. Cl.
*B65G 43/08*   (2006.01)
*G01B 11/02*   (2006.01)
*G06T 7/73*    (2017.01)

(52) U.S. Cl.
CPC ............ *B65G 43/08* (2013.01); *G01B 11/026* (2013.01); *G06T 7/73* (2017.01); *B65G 2203/0216* (2013.01); *B65G 2203/044* (2013.01)

(58) Field of Classification Search
CPC .............. B65G 43/08; B65G 2203/044; B65G 2203/0216; G06T 7/73; G01B 11/026
(Continued)

(56) References Cited

U.S. PATENT DOCUMENTS

| 11,582,380 B2 * | 2/2023 | Schneider .......... G06K 7/10841 |
| 11,649,117 B2 * | 5/2023 | Durtschi ................ B65G 47/38 198/340 |
| 2019/0025849 A1 | 1/2019 | Dean |

FOREIGN PATENT DOCUMENTS

| CN | 104880905 A | 9/2015 |
| CN | 105787407 A | 7/2016 |

(Continued)

OTHER PUBLICATIONS

Zou, CN106596555A (Year: 2017).*
(Continued)

*Primary Examiner* — Gene O Crawford
*Assistant Examiner* — Lester Rushin, III
(74) *Attorney, Agent, or Firm* — Barley Snyder

(57) ABSTRACT

An image acquisition system comprises an image capture device and a guide mechanism. The image capture device captures an image of at least a part of a surface of an article located on an article placement surface. The guide mechanism is positioned to be separated from the article placement surface. The image capture device is movably mounted on the guide mechanism such that the image capture device is movable along the guide mechanism to adjust a spacing between the image capture device and the surface of the article located on the article placement surface. The image capture device captures the image when the spacing is equal to a predetermined working distance.

20 Claims, 6 Drawing Sheets

(58) Field of Classification Search
USPC .............................. 198/340.01, 340, 301, 358
See application file for complete search history.

(56) References Cited

FOREIGN PATENT DOCUMENTS

| | | |
|---|---|---|
| CN | 205480055 U | 8/2016 |
| CN | 108259731 A | 7/2018 |
| CN | 108898129 A | 11/2018 |
| CN | 108953939 A | 12/2018 |
| CN | 109414819 A | 3/2019 |
| CN | 212163541 U | 12/2020 |
| CN | 212512926 U | 2/2021 |

OTHER PUBLICATIONS

Jp2021531223 (Year: 2021).*
EP3757042a1 (Year: 2022).*
Cn106596555 (Year: 2023).*
EP3757042 (Year: 2023).*
Chinese First Office Action dated Jul. 31, 2023 with English translation, corresponding to Application No. 202110263815.9, 16 pages.

\* cited by examiner

IMAGE ACQUISITION SYSTEM AND ARTICLE INSPECTION SYSTEM

CROSS-REFERENCE TO RELATED APPLICATIONS

This application claims the benefit of Chinese Patent Application No. 202110263815.9 filed on Mar. 11, 2021 in the China National Intellectual Property Administration, the whole disclosure of which is incorporated herein by reference.

FIELD OF THE INVENTION

Embodiments of the present disclosure generally relate to article inspection, and more specifically, to an image acquisition system and an article inspection system adapted to different sizes of articles.

BACKGROUND

In some article conveying applications, it is necessary to use an image capture device to obtain the image of the conveyed article, such as the image of a bar code, identifier and other symbols on the article, so as to identify or mark the article, obtain the size of the article, etc. The conveyed articles usually have different heights or sizes, which will cause the image capture device to defocus and not read the bar code correctly.

Some conventional techniques use auto focus image capture devices, such as the use of auto focus lenses, which will produce distortion in the final image, which may lead to failure to correctly read or recognize bar codes, etc. If the article size is measured together with bar code reading, this distortion will directly lead to measurement failure or inaccuracy.

SUMMARY

According to an embodiment of the present disclosure, an image acquisition system comprises an image capture device and a guide mechanism. The image capture device captures an image of at least a part of a surface of an article located on an article placement surface. The guide mechanism is positioned to be separated from the article placement surface. The image capture device is movably mounted on the guide mechanism such that the image capture device is movable along the guide mechanism to adjust a spacing between the image capture device and the surface of the article located on the article placement surface. The image capture device captures the image when the spacing is equal to a predetermined working distance.

BRIEF DESCRIPTION OF THE DRAWINGS

The invention will now be described by way of example with reference to the accompanying Figures, of which.

DETAILED DESCRIPTION OF THE EMBODIMENTS

Figure 1:
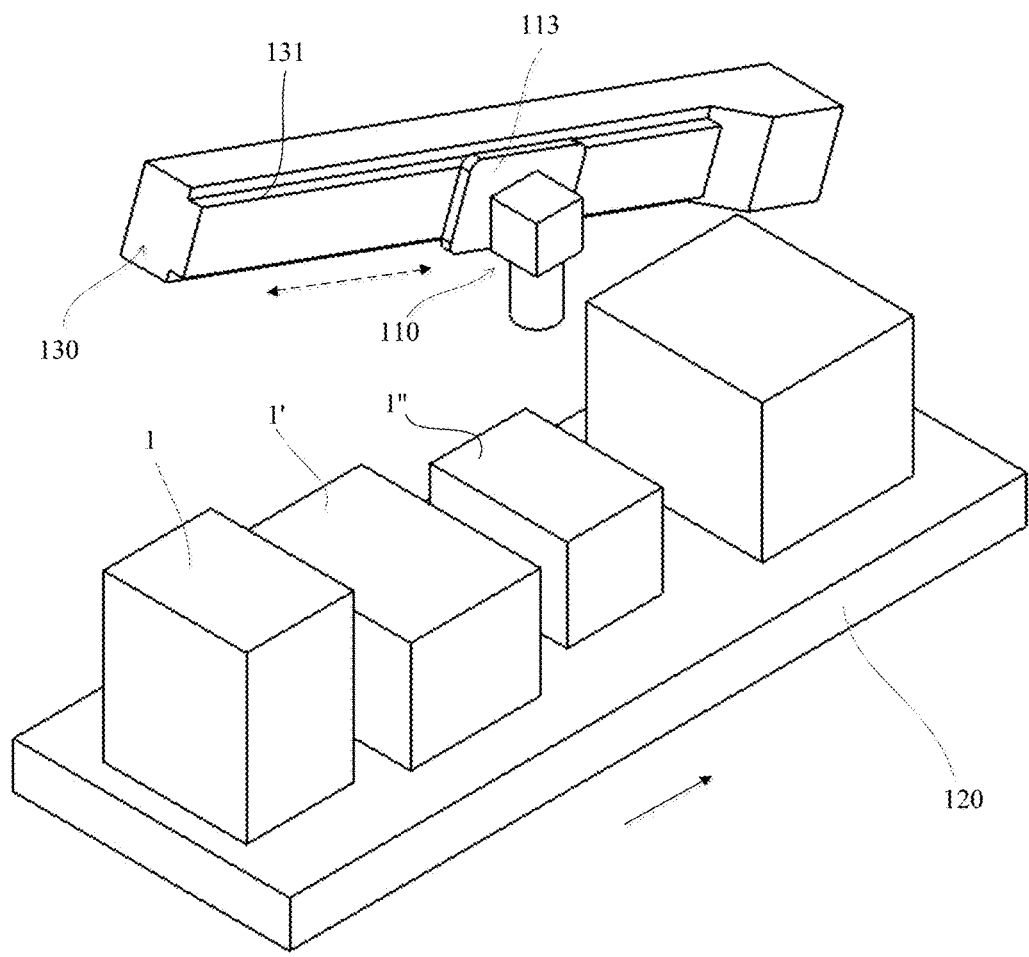
FIG. 1 is a perspective view schematically showing a configuration of an article inspection system according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided an image acquisition system, comprising: an image capture device for capturing an image of at least a part of a surface of an article located on an article placement surface; and a guide mechanism arranged to be separated from the article placement surface, the image capture device is movably mounted on the guide mechanism so that the image capture device is capable of being moved along the guide mechanism to adjust a spacing between the image capture device and the surface of the article located on the article placement surface, the image capture device is configured to capture the image when the spacing is equal to a predetermined working distance.

According to an exemplary embodiment of the present disclosure, an article inspection system includes an image acquisition system and an article placement surface for placing an article to be inspected. The article placement surface is, for example, a working surface of a workbench, or the article inspection system includes a conveying mechanism having the working surface as the article placement surface. The conveying mechanism includes, for example, a conveyor belt, etc, Different sizes of articles to be inspected can be transported, and the image acquisition system is suitable for acquiring images of a variety of articles with different sizes (such as height) for article identification or inspection.

As shown in FIGS. 1-4, the image acquisition system includes an image capture device (e.g., a camera) 110 for capturing an image of at least a part of a surface of articles (1, 1', 1" . . . ) with different sizes (such as height) located on the article placement surface for article identification or inspection. In the illustrated embodiment, the article placement surface is the working surface of the conveying mechanism as an example. For example, the image capture device may be used to acquire at least images of various symbols on the surface of the article conveyed on the conveying mechanism, such as two-dimensional code, bar code, identifier, etc. For example, the image capture device includes a barcode reader and/or a camera. In other embodiments, the image capture device may capture an image of the entire surface of an article (such as a box), and the size of the article may be determined based on the image.

Generally, the articles (1, 1', 1" . . . ) conveyed on the conveying mechanism 120 may have different sizes, which leads to different distances from the surface of different articles to the image capture device, and the surface of the articles falls outside the depth of field of the image capture device, and the image capture device cannot focus properly on the surface of the articles and cannot obtain a clear image.

According to an exemplary embodiment of the present disclosure, the image acquisition system also includes a guide mechanism 130 arranged to be separated from the conveying mechanism 120, and the image capture device 110 is movably mounted on the guide mechanism 130 so that the image capture device 110 can move along the guide mechanism 130 to adjust the spacing between the image capture device 110 and the surface of the article. As the image capture device 110 moves along the guide mechanism 130, the image capture device 110 can clearly capture an image of the surface of the article when the distance between the surface of the article and the image capture device 110 is adjusted to be equal to the predetermined working distance D of the image capture device 110. That is, instead of adjusting the focal length of the image capture device, by adjusting the spacing between the image capture device and the article surface, the image capture device always captures the image of the article surface at the most suitable focal length (E. G., fixed and optimal focal length) to avoid image distortion. It is understood that the spacing between the image capture device and the surface of the article may refer to the distance between its lens or the end of the lens and the surface of the article. It can be determined by the image capture device itself whether the spacing is equal to the predetermined working distance, or a separate sensor can be set to detect the spacing.

The predetermined working distance D can be preset according to the focal length setting of the image capture device, the image resolution requirements, the symbol type on the surface of the article to be inspected, etc., so that when the spacing between the surface of the article and the image capture device 110 is equal to the predetermined working distance D, the surface of the article is located in the depth of field of the image capture device 110. Thus, a clear image of the surface of the article can be obtained.

Figure 3A:
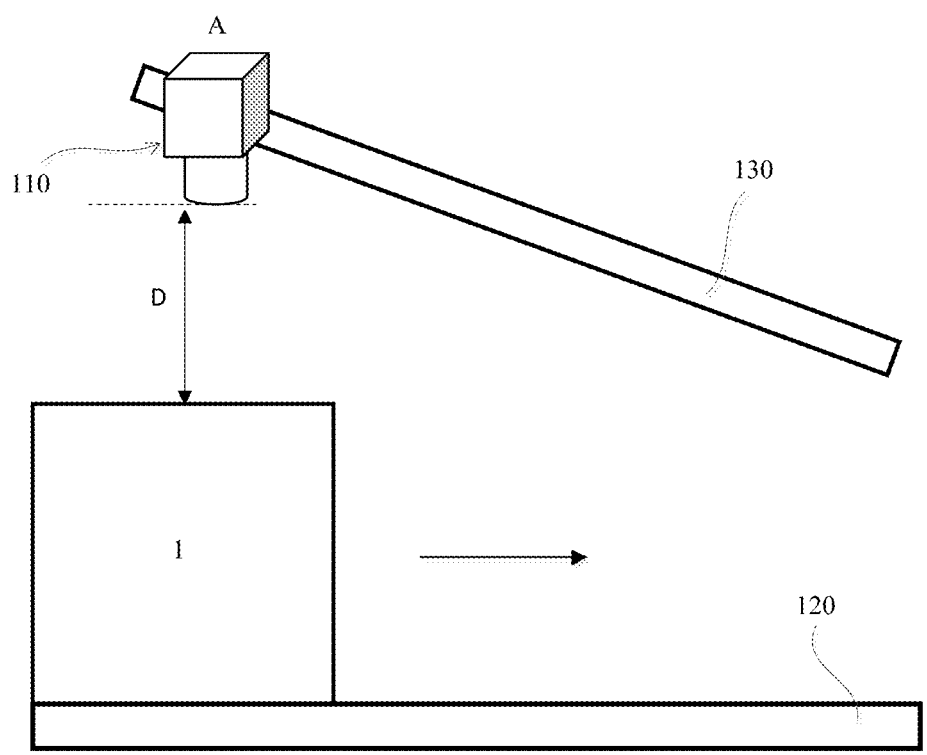
FIGS. 3A to 3C are side views schematically showing a process of acquiring images of articles of different sizes according to an exemplary embodiment of the present disclosure.
Figure 3B:
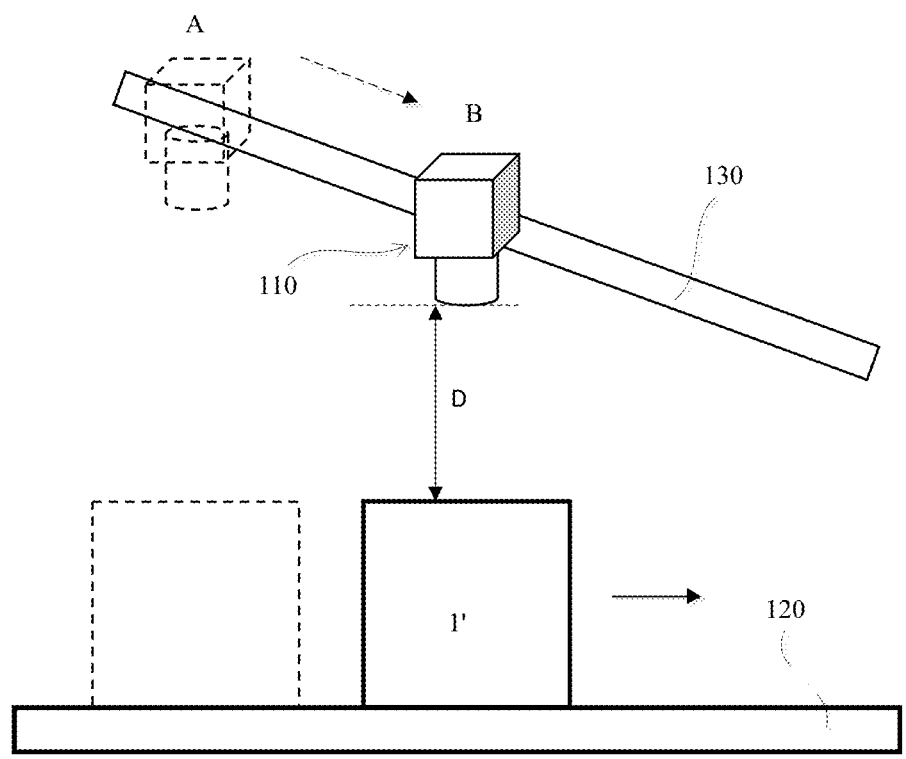
Figure 3C:
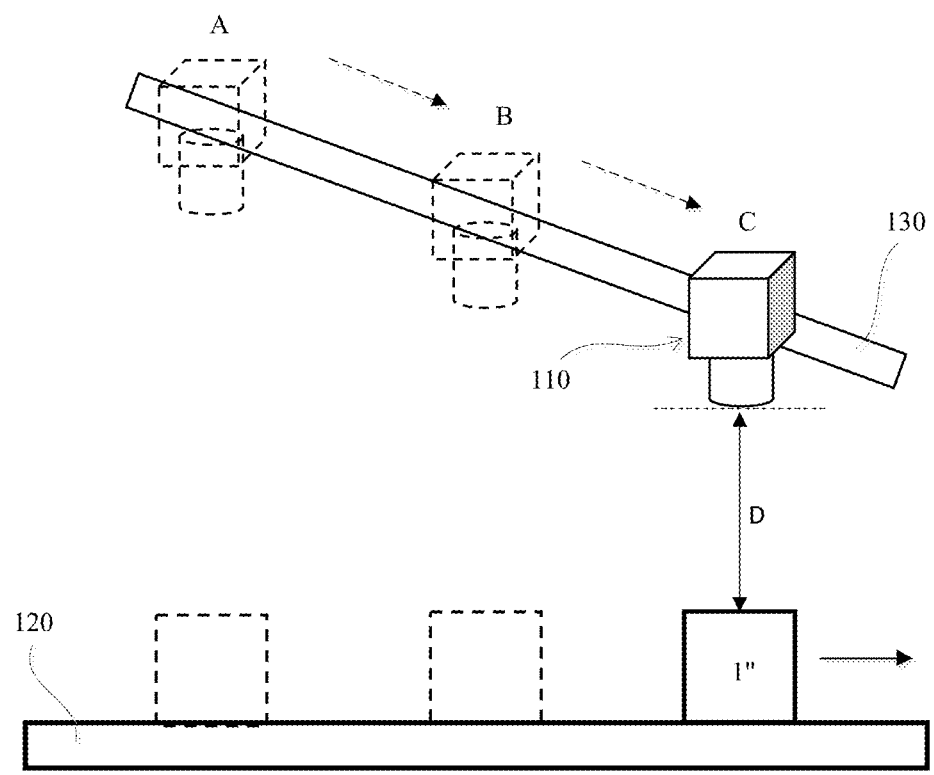

In an exemplary embodiment, as shown in FIGS. 3A to 3C, the image capture device 110 is arranged to move along the guide mechanism 130 as the conveying mechanism 120 conveys the articles (1, 1', 1" . . . ), so as to adjust the spacing between the image capture device 110 and the surface of the article to be equal to the predetermined working distance D. In other embodiments, the image capture device may be configured to move along the guide mechanism when the conveying mechanism and the article conveyed by it are stopped or temporarily stationary relative to the guide mechanism, so as to adjust the spacing between the image capture device and the surface of the article.

Figure 2:
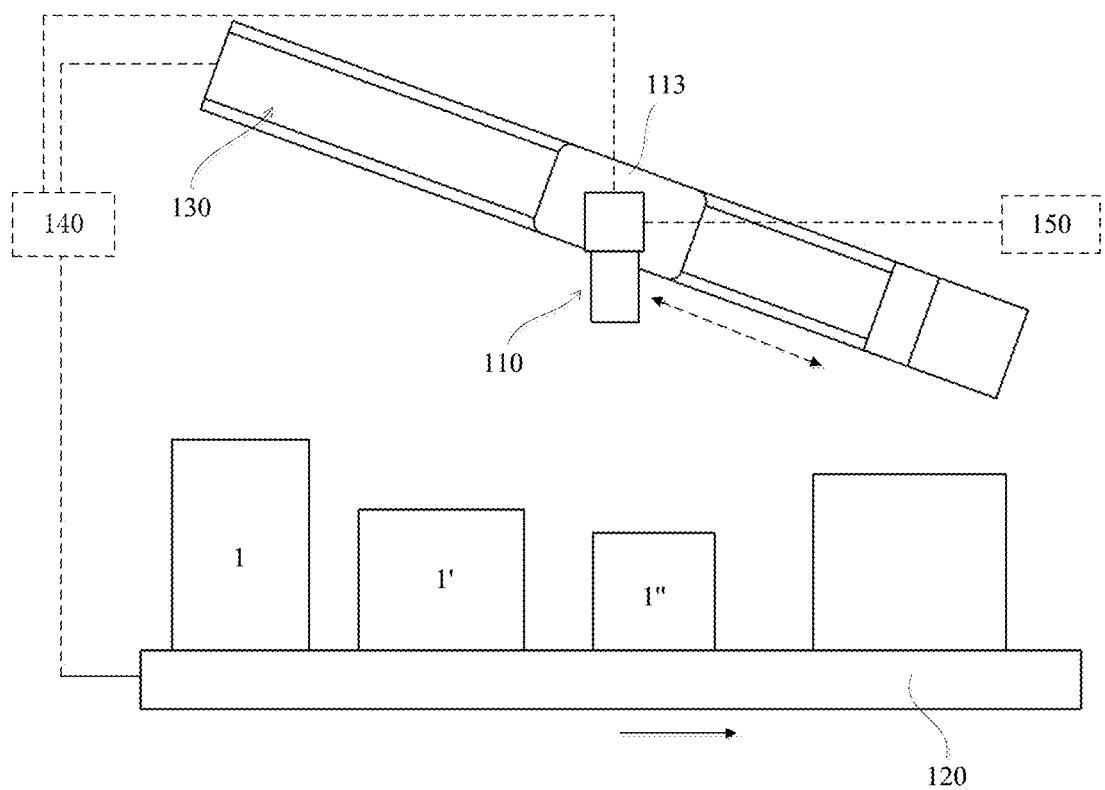
FIG. 2 is a side view schematically showing a configuration of an article inspection system according to an exemplary embodiment of the present disclosure.

For example, as shown in FIG. 2, the article inspection system may be provided with a controller 140, which may communicate with the image capture device 110, the conveying mechanism 120 or the guiding mechanism 130 to control or coordinate the moving speed of the image capture device 110 along the guiding mechanism 130 and/or the speed of conveying the article by the conveying mechanism 120 so that the spacing between the image capture device 110 and the surface of the article to be inspected can be appropriately adjusted to be equal to the predetermined working distance D within the moving range of the image capture device 110 along the guiding mechanism 130. As shown in the figure, the article inspection system may also be provided with an image processor 150, which checks or identifies an article based on the image acquired by the image capture device 110. In other examples, the image processor may also be integrated in the image capture device or the controller.

According to an exemplary embodiment of the present disclosure, the guide mechanism 130 is arranged relative to the conveying mechanism 120 so that the moving direction (the direction of the two-way dotted line arrow in the figure) of the image capture device 110 along the guide mechanism 130 is at an angle greater than or equal to 0 degrees and less than 180 degrees with respect to the conveying direction (the direction of the one-way solid line arrow in the figure) of the article by the conveying mechanism 120. Thus, when the image capture device 110 moves along the guide mechanism 130 or when the guide mechanism 130 moves relative to the conveying mechanism 120 (as described below), the spacing between the image capture device 110 and the surface of the article can be changed. Through the movement of the image capture device along the guide mechanism and/or through the movement of the guide mechanism relative to the conveying mechanism, the appropriate adjustment of this spacing can be realized to meet the requirements of the above predetermined working distance.

In the illustrated embodiment, the guide mechanism 130 and the image capture device 110 are arranged above the conveying mechanism 120 so that the image capture device 110 acquires an image of at least a part of the upper surface of the articles (1, 1', 1" . . . ) conveyed on the conveying mechanism 120. When the conveying mechanism 120 conveys a plurality of articles (1, 1', 1" . . . ) with different heights, the image capture device 110 may be moved along the guide mechanism 130 positioned above the article to adjust the spacing between the image capture device 130 and the upper surface of each article so that the spacing is equal to the predetermined working distance D.

For example, referring to FIG. 3A, when the height of the article 1 conveyed by the conveying mechanism 120 is large, the image capture device 110 in the initial position A can ensure that the spacing between the image capture device 110 and the upper surface of the article 1 is equal to the predetermined working distance D without moving along the guide mechanism 130 or only moving a short distance along the guide mechanism 130. At this time, an image of the upper surface of the article 1 may be captured by the image capture device 110.

Referring to FIG. 3B, when the height of the article 1' conveyed by the conveying mechanism 120 is medium, the spacing between the image capture device 110 in the initial position A and the upper surface of the article 1' is greater than the predetermined working distance D; Therefore, as the conveying mechanism 120 conveys the article 1', the image capture device 110 needs to move along the guide mechanism 130 to adjust the spacing. At position B, the spacing between the image capture device 110 and the upper surface of the article 1' is equal to the predetermined working distance D. At this time, the image of the upper surface of the article 1' can be captured by the image capture device 110.

Referring to FIG. 3C, when the height of the article 1" conveyed by the conveying mechanism 120 is small, the spacing between the image capture device 110 and the upper surface of the article 1" at positions A and B is greater than the predetermined working distance D; Therefore, as the conveying mechanism 120 conveys the article 1", the image capture device 110 needs to move a large distance along the guide mechanism 130 to adjust the spacing. At position C, the spacing between the image capture device 110 and the upper surface of the article 1″ is equal to the predetermined working distance D. At this time, the image of the upper surface of the article 1″ can be captured by the image capture device 110. After completing the image capture, the image capture device can return to the initial position to prepare for the article shooting of the next article. It can be understood that when the spacing between the image capture device in the initial position and the surface of the article to be inspected is less than the predetermined working distance, the orientation (E. G., tilt angle) or position of the guide mechanism can be adjusted so that the spacing can be increased to be equal to the predetermined working distance.

In other embodiments, the guide mechanism and the image capture device may be arranged on the side of the conveying mechanism so that the image capture device acquires an image of at least a part of the side surface of articles with different sizes (such as width or transverse size) transported on the conveying mechanism, or the guide mechanism and the image capture device may be arranged above and on the side of the conveying mechanism.

As an example, the image capture device 110 may slide linearly along the guide mechanism 130 or along a preset trajectory. For example, the image capture device 110 may be mounted to the guide mechanism 130 by means of a slider 113. The guide mechanism 130 includes a guide rail 131, and the slider 113 can slide in opposite directions along the guide rail 131. The guide rail can be a linear track or a curved track, such as an arc track.

In some exemplary embodiments, in addition to the image capture device 110 moving along the guide mechanism 130, the guide mechanism 130 may also move to adjust its orientation or position, such as moving in at least one of three directions orthogonal to each other (such as X, Y, Z directions), such as three-dimensional adjustable, to adjust the spacing between the image capture device 110 and the surface of the article conveyed on the conveying mechanism 120.

Figure 4:
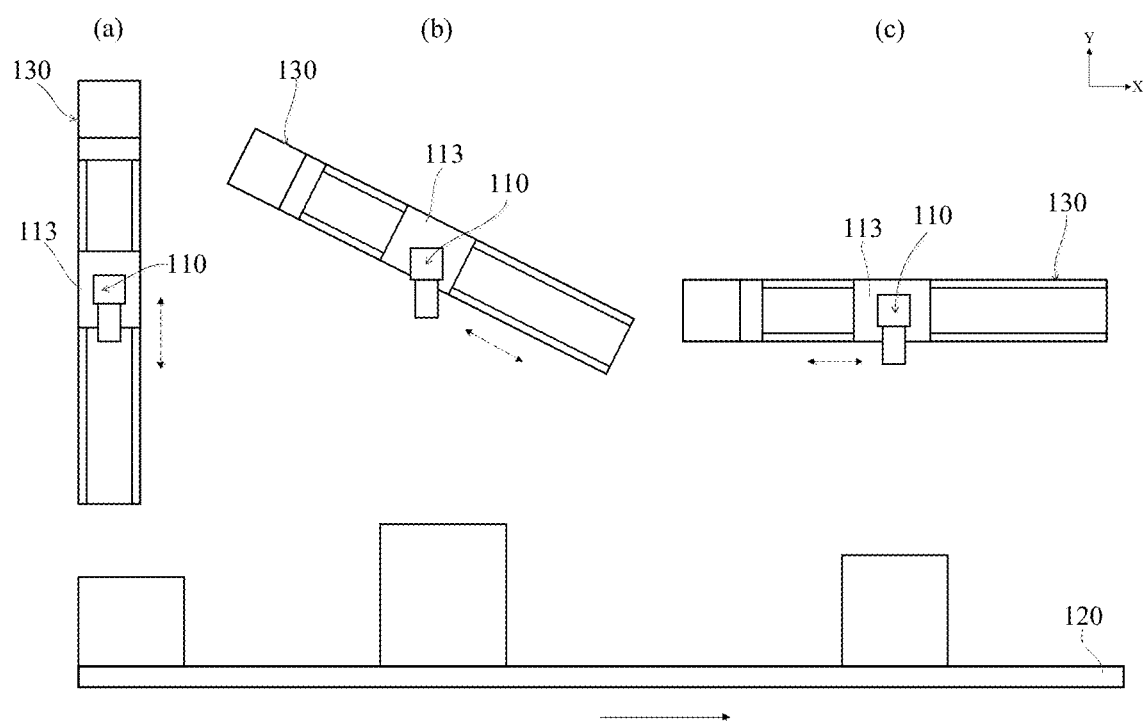
FIG. 4 is a side perspective view schematically showing different orientations of a guide mechanism of an image acquisition system according to an exemplary embodiment of the present disclosure.

In some exemplary embodiments, as shown in FIG. 4, the orientation of the guide mechanism 130 relative to the conveying mechanism 120 can be adjusted so that the angle between the moving direction of the guide mechanism 130 and the conveying direction of the conveying mechanism 120 is adjustable, for example, the angle between the extension direction of the guide rail 131 and the conveying direction of the article by the conveying mechanism 120 is adjustable, so that the moving speed and the moving direction of the image capture device 110 along the guide mechanism 130 can be adjusted.

For example, in the configuration shown in part (a) of FIG. 4, the guide mechanism 130 or its guide rail 131 is vertically oriented with respect to the conveying mechanism 120, and at this time, the spacing between the image capture device 110 and the article surface can be adjusted relatively quickly. This spacing can be adjusted when the conveying mechanism 120 stops moving the article, or when the guide mechanism 130 is moved simultaneously (e.g. in the X direction) with the article moved by the conveying mechanism 120, that is, the moving speed of the guide mechanism 130 can be kept synchronized with the conveying speed of the article by the conveying mechanism 120, and this spacing can be adjusted so that the spacing is equal to the predetermined working distance D, and so that the image capture device 110 captures an image of the surface of the article.

In the configuration shown in part (b) of FIG. 4, the guide mechanism 130 or its guide rail 131 is oriented obliquely or at an angle greater than 0 degrees and less than 180 degrees with respect to the conveying mechanism 120. At this time, the movement of the image capture device 110 along the guide mechanism 130 may include a motion component parallel to the conveying direction of the article by the conveying mechanism 120 and a motion component perpendicular to the conveying direction of the article by the conveying mechanism 120. By adjusting the tilt angle of the guide mechanism, the adjustment speed of the spacing between the image capture device 110 and the article surface can be changed. In the configuration shown in part (b) of FIG. 4, the orientation and/or position of the guide mechanism relative to the conveying mechanism can also be adjusted as needed.

In the configuration shown in part (c) of FIG. 4, the guide mechanism 130 or its guide rail 131 is oriented roughly parallel to the conveying mechanism 120, which can be applied to the case where the size of the articles to be inspected is the same or the difference is small; Of course, it is also necessary to adjust the position of the guide mechanism relative to the conveying mechanism (such as the position in the Y direction) to adapt to articles of different sizes.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An image acquisition system, comprising:
    an image capture device capturing an image of at least a part of a surface of an article located on an article placement surface; and
    a guide mechanism positioned to be separated from the article placement surface and including a guide rail, the image capture device is movably mounted on the guide mechanism in a sliding manner along the guide rail to adjust a spacing between the image capture device and the surface of the article located on the article placement surface, the image capture device capturing the image when the spacing is equal to a predetermined working distance.

2. The image acquisition system according to claim 1, wherein a conveying mechanism for conveying the article includes the article placement surface.

3. The image acquisition system according to claim 2, wherein the guide mechanism is arranged relative to the conveying mechanism such that the spacing between the image capture device and the surface of the article is changed when the image capture device moves along the guide mechanism.

4. The image acquisition system according to claim 3, wherein the guide mechanism is arranged relative to the conveying mechanism so that a moving direction of the image capture device along the guide mechanism is at an angle greater than or equal to 0 degrees and less than 180 degrees with respect to a conveying direction of the article by the conveying mechanism.

5. The image acquisition system according to claim 3, wherein the guide mechanism and the image capture device are arranged above the conveying mechanism so that the image capture device captures an image of at least a part of an upper surface of the article conveyed on the conveying mechanism.

6. The image acquisition system according to claim 5, wherein the image capture device moves along the guide mechanism when the conveying mechanism conveys a plurality of articles with different heights to adjust the spacing between the image capture device and the upper surface of each article so that the spacing is equal to the predetermined working distance.

7. The image acquisition system according to claim 3, wherein the image capture device moves along the guide mechanism as the conveying mechanism conveys the article so that the spacing between the image capture device and the surface of the article is equal to the predetermined working distance.

8. The image acquisition system according to claim 3, wherein the orientation or position of the guide mechanism relative to the conveying mechanism is adjusted so that the angle between a moving direction of the guide mechanism and a conveying direction of the conveying mechanism is adjustable.

9. The image acquisition system according to claim 1, wherein the image capture device is slid linearly along the guide mechanism.

10. The image acquisition system according to claim 1, wherein the predetermined working distance is set such that the surface of the article is located within a depth of field of the image capture device when the spacing is equal to the predetermined working distance.

11. The image acquisition system according to claim 1, wherein the image capture device acquires at least an image of a barcode or identifier on the surface of the article located on the article placement surface.

12. The image acquisition system according to claim 11, wherein the image capture device includes at least one of a barcode reader or a camera.

13. The image acquisition system according to claim 1, wherein the guide mechanism moves in at least one of three directions orthogonal to each other to adjust the spacing between the image capture device and the surface of the article located on the article placement surface.

14. An article inspection system, comprising:
an article placement surface on which an article to be inspected is placed;
an image acquisition system used to acquire an image of at least a part of a surface of the article located on the article placement surface, the image acquisition system comprising:
an image capture device capturing the image; and
a guide mechanism positioned to be separated from the article placement surface and including a guide rail, the image capture device is movably mounted on the guide mechanism in a sliding manner along the guide rail so that the image capture device is movable along the guide mechanism to adjust a spacing between the image capture device and the surface of the article located on the article placement surface, the image capture device capturing the image when the spacing is equal to a predetermined working distance; and
an image processor inspecting or identifying the article based on the image.

15. The article inspection system according to claim 14, further comprising a conveying mechanism defining the article placement surface and conveying a plurality of articles with different sizes.

16. The article inspection system according to claim 15, wherein the guide mechanism is arranged relative to the conveying mechanism such that the spacing between the image capture device and the surface of the article is changed when the image capture device moves along the guide mechanism.

17. The article inspection system according to claim 16, wherein the guide mechanism and the image capture device are arranged above the conveying mechanism so that the image capture device captures an image of at least a part of an upper surface of the article conveyed on the conveying mechanism.

18. The article inspection system according to claim 17, wherein the image capture device moves along the guide mechanism when the conveying mechanism conveys a plurality of articles with different heights to adjust the spacing between the image capture device and the upper surface of each article so that the spacing is equal to the predetermined working distance.

19. The article inspection system according to claim 16, wherein the image capture device moves along the guide mechanism as the conveying mechanism conveys the article so that the distance between the image capture device and the surface of the article is equal to the predetermined working distance.

20. An image acquisition system, comprising:
a conveying mechanism adapted to convey an article and defining an article placement surface;
an image capture device capturing an image of at least a part of a surface of the article located on the article placement surface; and
a guide mechanism positioned to be separated from the article placement surface, the image capture device is movably mounted on the guide mechanism in a linear sliding manner along the guide rail to adjust a spacing between the image capture device and the surface of the article located on the article placement surface, the image capture device capturing the image when the spacing is equal to a predetermined working distance, an orientation or position of the guide mechanism relative to the conveying mechanism is adjustable between a vertical orientation, at least one inclined orientation, and a horizontal orientation such that an angle between a moving direction of the guide mechanism and a conveying direction of the conveying mechanism is adjustable.

* * * * *